(12) United States Patent
Cairns et al.

(10) Patent No.: US 10,438,169 B2
(45) Date of Patent: Oct. 8, 2019

(54) SYSTEMS AND METHODS FOR PROVIDING BINARY DATA FILES FOR REAL-TIME COLLABORATION

(71) Applicant: Google Inc., Mountain View, CA (US)

(72) Inventors: Brian Lewis Cairns, Boulder, CO (US); John Day-Richter, Denver, CO (US)

(73) Assignee: GOOGLE LLC, Mountain View, CA (US)

(*) Notice: Subject to any disclaimer, the term of this patent is extended or adjusted under 35 U.S.C. 154(b) by 183 days.

(21) Appl. No.: 14/213,839

(22) Filed: Mar. 14, 2014

(65) Prior Publication Data

US 2014/0280596 A1 Sep. 18, 2014

Related U.S. Application Data

(60) Provisional application No. 61/784,898, filed on Mar. 14, 2013.

(51) Int. Cl.
*G06F 13/00* (2006.01)
*G06Q 10/10* (2012.01)
(Continued)

(52) U.S. Cl.
CPC ....... *G06Q 10/101* (2013.01); *G06F 17/2258* (2013.01); *G06F 17/2288* (2013.01); *G06F 17/24* (2013.01)

(58) Field of Classification Search
CPC ........ G06Q 10/10; G06Q 10/101; G06F 8/30; G06F 8/36; G06F 8/66; G06F 8/71; G06F 9/44521; G06F 13/00; G06F 17/24; G06F 17/2258; G06F 17/2288; H04L 12/581; H04L 29/06027; H04L 29/06;
(Continued)

(56) References Cited

U.S. PATENT DOCUMENTS 7,457,830 B1 * 11/2008 Coulter ............... G06F 11/1471
7,647,415 B1    1/2010 Sandoz et al.
(Continued)

OTHER PUBLICATIONS

PCT/US2014/029763 International Search Report dated Jul. 29, 2014.
(Continued)

*Primary Examiner* — Robert B Harrell
(74) *Attorney, Agent, or Firm* — Lowenstein Sandler LLP

(57) ABSTRACT

A document collaboration system allows applications to collaborate on a binary data file even if the binary data file is not in a collaborative document format. In response to a request from an application to access a binary data file, the document collaboration system gives the application access to a document model corresponding to the binary data file and the application. If the document model does not already exist, it may be created by generating an empty document model, transmitting the binary data file to the application, and allowing the application to fill in the empty document model based on the binary data file. The document model may be provided to and modified by its related application through an application programming interface (API), and changes to the document model may be applied to the binary data file.

31 Claims, 7 Drawing Sheets

(51) Int. Cl.
*G06F 17/24* (2006.01)
*G06F 17/22* (2006.01)

(58) Field of Classification Search
CPC ......... H04L 29/06462; H04L 29/06523; H04L 29/08072; H04L 65/403
USPC .................................. 709/204, 239; 717/122
See application file for complete search history.

(56) References Cited

U.S. PATENT DOCUMENTS

| | | | |
|---|---|---|---|
| 7,660,790 B1 * | 2/2010 | Batterywala | G06F 17/30067 |
| | | | 707/637 |
| 9,367,579 B1 * | 6/2016 | Kumar | G06F 17/30144 |
| 2003/0097410 A1 | 5/2003 | Atkins et al. | |
| 2004/0015860 A1 * | 1/2004 | Craft | G06F 11/362 |
| | | | 717/122 |
| 2004/0078370 A1 * | 4/2004 | Acree | G06F 17/30575 |
| 2005/0138109 A1 | 6/2005 | Redlich et al. | |
| 2005/0171970 A1 | 8/2005 | Ozzie et al. | |
| 2007/0136396 A1 * | 6/2007 | Kulkarni | G06F 8/71 |
| 2008/0154983 A1 * | 6/2008 | Lee | G06F 17/2288 |
| 2014/0244713 A1 * | 8/2014 | Grimm | H04L 67/42 |
| | | | 709/203 |

OTHER PUBLICATIONS

Written Opinion of the International Search Authority for International Application No. PCT/US2014/029763, dated Jul. 29, 2014, 4 pages.

\* cited by examiner

SYSTEMS AND METHODS FOR PROVIDING BINARY DATA FILES FOR REAL-TIME COLLABORATION

CROSS-REFERENCE TO RELATED APPLICATIONS

This application claims priority to U.S. Provisional Application Ser. No. 61/784,898, filed on Mar. 14, 2013, entitled "Real-Time Collaboration for Binary Data Files," the entire contents of which are hereby incorporated by reference.

FIELD OF INVENTION

The present disclosure relates generally to systems and methods for real-time collaboration on a binary data file.

INTRODUCTION

Personal computers traditionally use only directly accessible resources to run programs and store files. But as network access has become more widespread, it has become feasible to run programs and store files using remote resources. The use of remote resources, commonly referred to as cloud computing, can allow a user to access a file or an application using any device that can access a network. Cloud computing can thereby reduce the user's need for local computer resources and assure the user that, regardless of which device is available, the user will be able to access an up-to-date version of a desired file. Moreover, granting multiple users access to a file allows a group to collaborate on a file without raising questions of whether a file received by a collaborator reflects recent updates by other collaborators.

Document collaboration systems generally operate with files in a collaborative document format. To the extent that a document collaboration system allows interaction with binary data files in other formats, they allow users to convert files from one format out of a list of certain standard formats to a collaborative document format that the system is designed to work with directly.

SUMMARY

It is a realization of the inventors that restricting which formats of binary data files a document collaboration system may interact with decreases the efficacy of the document collaboration system. Developers wishing to write applications interfacing with such collaborative systems are restricted to using one of a limited number of document formats that may be inappropriate for their applications. Moreover, even if the document collaboration system can convert a binary data file into an appropriate format, the document conversion process is manual and may thus result in multiple users creating multiple copies of a file using different applications. Furthermore, merging changes from the multiple copies of the file may require a user to go through a tedious process of searching the file history of multiple files to determine changes, and carefully merge the changes across the multiple files. Thus there exists a need in the art for a document collaboration system capable of interacting with binary data files in any format. The systems and methods described herein allow a document collaboration system to permit users to collaborate on a single binary data file that is not formatted as a collaborative document.

In certain aspects, the systems and methods described herein relate to allowing applications to collaborate on a binary data file. In response to a request from a first client application to access a binary data file, a document collaboration system determines whether a first document model corresponding to the binary data file and associated with the first client application exists. If not, the document collaboration engine generates such a first document model, in some implementations by generating an empty document model, providing information regarding the binary data file to the first client application, and instructing the first client application to populate the empty document model based on the information regarding the binary data file. The document collaboration system transmits data corresponding to the first document model to the first client application. The first client application may then revise the binary data file by modifying the first document model. In some implementations, the document collaboration system also receives a second request from a second client application to access the same binary data file. In such implementations, the document collaboration system determines whether a second document model corresponding to the binary data file and associated with the second client application exists and has content matching that of the binary data file. If the second document model's content matches that of the binary data file, or if the second client application was the last application to alter the binary data file, the document collaboration system may provide information regarding the second document model to the second client application. Otherwise, the document collaboration system may generate a new second document model. In some implementations, document models may be provided to and modified by their related applications through an application programming interface (API), and changes to the document model may be applied to the binary data file.

BRIEF DESCRIPTION OF THE DRAWINGS

The systems and methods described herein are set forth in the appended implementations. However, for the purpose of explanation, several embodiments are set forth in the following drawings.

DETAILED DESCRIPTION

To provide an overall understanding of the disclosure, certain illustrative embodiments will now be described, including a system for implementing real-time collaboration for binary data. However, it will be understood that the systems and methods described herein may be adapted and modified as is appropriate for the application being addressed and that the systems and methods described herein may be employed in other suitable applications, and that such other additions and modifications will not depart from the scope thereof. While systems and methods described herein refer to real-time collaboration for binary data files, it will be understood that these systems and methods may apply to updates of any type of electronic files.

The systems and methods described herein relate to collaboration on a binary data file. When a client application requests access to a binary data file, the document collaboration system may determine whether a document model that both corresponds to the binary data file and is associated with the client application exists. If not, the document collaboration engine generates such a document model, in some implementations by providing the binary data file to the client application and instructing the client application to fill an empty document model based on the binary data file. The document collaboration system transmits data corresponding to the document model to the client application and any other copies of the client application requesting access to the binary data file. The client application may then modify the first document model, and may duplicate changes to the first document model in the binary data file.

Figure 1:
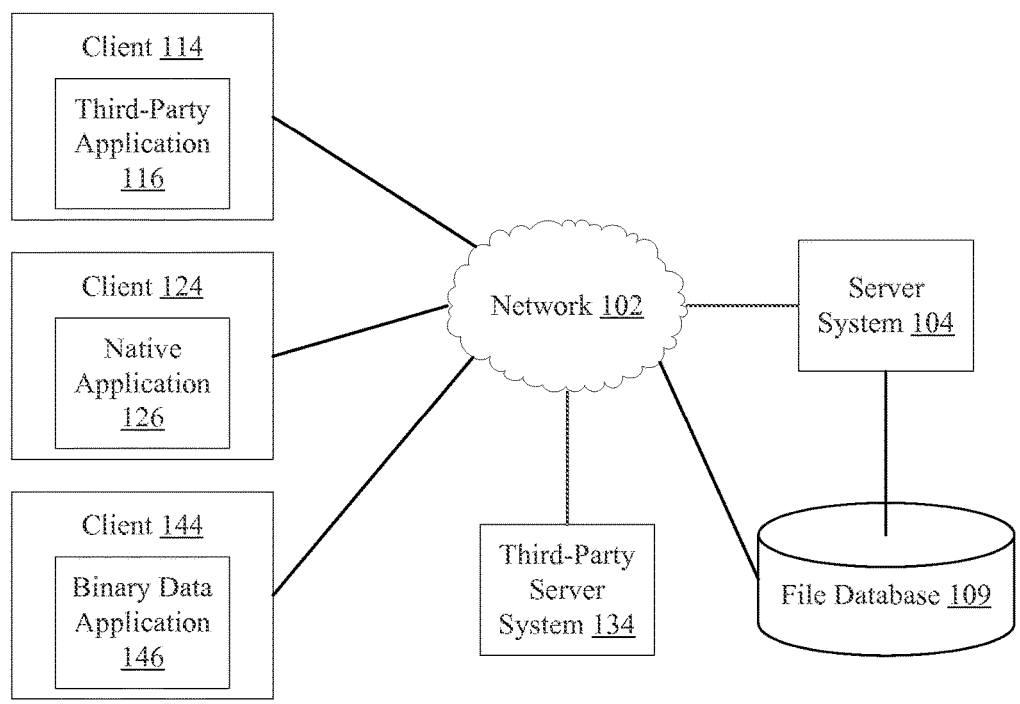
FIG. 1 is a block diagram of a document collaboration system, according to an illustrative implementation.

FIG. 1 is an illustrative block diagram of a document collaboration system 100, in which server system 104 may provide document collaboration services to one or more users. Such services may include allowing users to generate, store, access, revise, or delete electronic documents, which may be stored in file database 109. Electronic documents may include text, pictures, audio files, video files, presentation files, spreadsheets, binary data files, computer instructions, HyperText Markup Language (HTML) files, or other suitable files. Server system 104 may be a server, a personal computer, a mainframe, a cluster of computing devices, or some other suitable computing device, and may be similar to the collaborative development service 130 described in FIG. 3 of co-pending application Ser. No. 13/224573 which is incorporated herein by reference in its entirety. Server system 104 is described in more detail in relation to FIG. 2. File database 109 is depicted as a stand-alone database system, but in some implementations may be a part of an internal data storage of the server system 104. Server system 104 may provide services to users via network 102. Network 102 is a computer network, and in certain implementations may be the Internet. One or more users may access the services provided by cloud computing device 102 through a third-party application 116 run by client 114, through a native application 126 run by client 124, or a binary data application 146 run by client 144. Third-party server system 134 be a server, a personal computer, a mainframe, a cluster of computing devices, or some other suitable computing device, and may store binary data files that users may collaborate on via server system 104, interface with server system 104 to modify binary data files according to user commands received from a client 114, 124, or 144, or provide other services to users. In some implementations there may be a different number of clients 114, 124, and/or 144, of third-party server systems 134, of server systems 104, or of file databases 109 than are here depicted.

Clients 114, 124, and 144 are computing devices used to access server system 104, and each may be a personal laptop computer, a personal desktop computer, a tablet computer, a smartphone, a game console, or some other suitable computing device. Each may compose or collaborate on a binary data file through its associated application. Client 114 is depicted as running a third-party application 116, client 124 a native application 126, and client 144 a binary data application 146. A third-party application 116 is an application provided by a party other than the providers of server system 104 and capable of interfacing with server system 104, in some implementations through an API. A native application 126 is an application provided by the providers of server system 104 and capable of interfacing with server system 104. A binary data application 146 is an application capable of modifying a binary data file, but may not be capable of interfacing with server system 104. In some implementations, one or more of third-party application 116, native application 126, and binary data application 146 may be web-based applications, which may be run by a web browser operating on a client according to instructions received from a server, such as server system 104 or third-party server system 134. In some implementations, one or more of clients 114, 124, and 144 may run more than one application, more than one variety of application, or more than one application of more than one variety. In certain implementations, one or more of clients 114, 124, and 144 may be associated with a cloud service account on server system 104. In such implementations, each associated client may provide information identifying itself to server system 104 upon first connecting to server system 104, and server system 104 may provide a service to the client upon verifying its identity.

Server system 104 may receive requests for user files from clients 114, 124, and 144 and from third-party server systems 134 via network 102. In response to the requests, server system 104 accesses user files stored on a file database 109. The requests from client systems 114, 124, and/or 144 may include requests to access a collaborative document model associated with a binary data file. Server system 104 may access a collaborative document model stored in local memory to respond to such requests. A collaborative document model may be similar to the data model 450 described in FIG. 3 of the co-pending application Ser. No. 13/224573. It is understood that the terms "document model" and "object model" can be used interchangeably and refer to the same general concept. Changes made to the collaborative document model may be reflected and stored in the binary data file on the file database.

Figure 2:
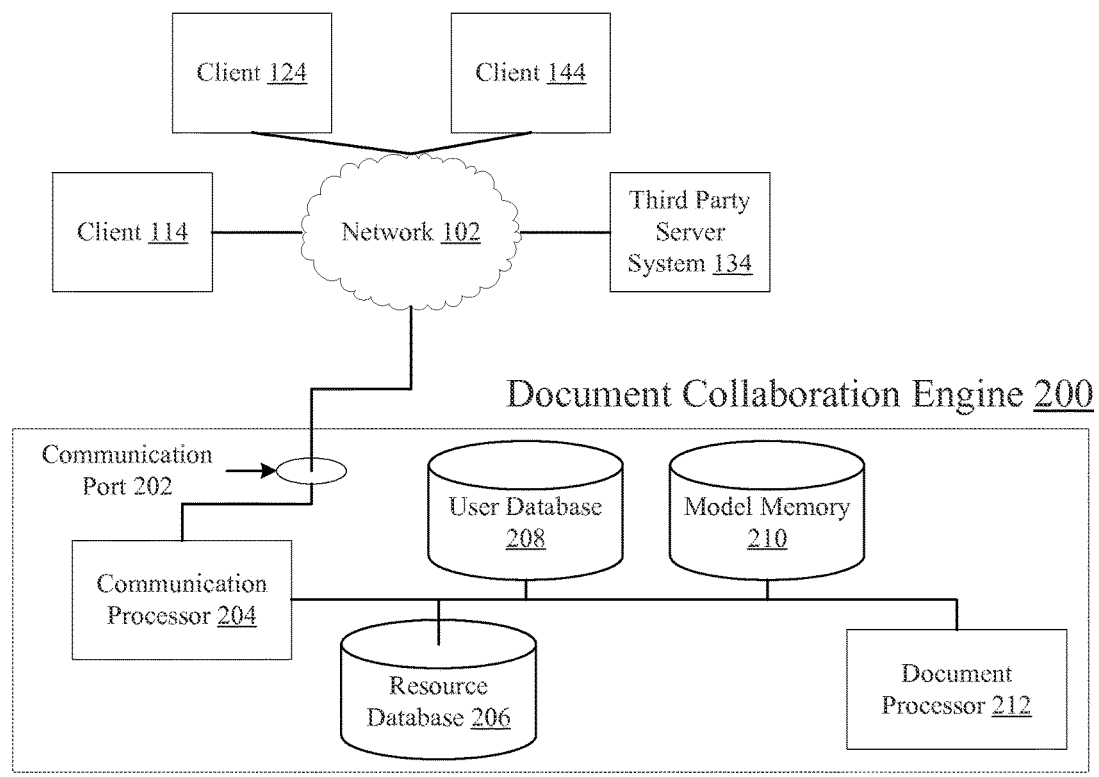
FIG. 2 is a block diagram of a document collaboration engine, according to an illustrative implementation.

FIG. 2 is an illustrative block diagram of a document collaboration engine 200, which may act as the server system 104 and file database 109 of FIG. 1. Document collaboration engine 200 allows a user to use a client 114, 124, or 144 or a third-party server system 134 to access services over network 102. Document collaboration engine 200 transmits and receives data through communication port 202. Communication processor 204 identifies user instructions received through communication port 202 and transmits information to a client based on the received instructions. Binary data files are stored in resource database 206, user information is stored in user database 208, collaborative document models are stored in model memory 210, and documents may be accessed, generated, altered, deleted, or otherwise manipulated by document processor 212.

The depicted communication port 202 is a network port which sends and receives data via network 102, which may include user commands, input to an electronic document stored by document collaboration engine 200, or other suitable data. Communication port 202 may include a 100 BASE-TX port, a 1000 BASE-T port, a 10 GBASE-T port, a Wi-Fi antenna, a cellular antenna, or other suitable network ports. In certain implementations, there may be a different number of ports than are depicted.

Communication processor 204 may be a computer processor that routes or acts upon data received through communication port 202. Upon a client or a third-party server connecting to document collaboration engine 200, communication processor 204 may identify a user associated with the connection, in certain implementations by comparing information provided in the connection request to information stored in user database 208. Communication processor 204 may further identify the user, client, or server from packet headers identifying the source of received data, by querying the client or server, from information provided by the client or server at login, or through some other suitable identification method. Communication processor 204 may forward user commands associated with a computing service to document processor 212, and may transmit data associated with an electronic document or a document model to a client based on the output of document processor 212. In certain implementations, communication processor 204 may encrypt communications to and decode communications from a client or server using the Secure Sockets Layer (SSL) protocol, the Transport Layer Security (TLS) protocol, or another suitable protocol.

In some implementations, communication processor 204 may verify that a user command regarding a document is authorized based on one or more predetermined criteria, which may include whether the user command is associated with a user account authorized to access the document, whether the user command was generated by an application associated with the user account and authorized to access the document, or other suitable criteria. In such implementations, if communication processor 204 does not verify the authorization of the user command, the communication processor 204 may perform one or more remedial actions, which may include transmitting an error message to a client associated with the user command, generating a warning to the user or a system administrator, or other remedial actions.

Resource database 206 may be a computer-readable and -writable medium storing at least one binary data file associated with a document collaboration system 100, which may include text, images, audio files, video files, spreadsheets, presentation files, HTML files, uncompiled computer code, compiled computer code, or other suitable resources. Such files may be associated with a particular user and may be shared with users other than the particular user. Resource database 206 may be localized on a single server or database, or may be distributed across multiple servers or databases. Resource database 206 may store information identifying one or more document models stored in model memory 210, where each document model is associated with both a file and an application that may be used to access the file. Resource database 206 may store information regarding changes to each document, which may include a record of when, by whom, and with what application the document was generated, accessed, and edited, or other suitable information. Resource database 206 may also store metadata associated with each document, which may include a Multipurpose Internet Mail Extensions (MIME) type of the document; a list of one or more users associated with the document; whether a user associated with the resource may access, edit, or delete the document; the application used to generate the resource; a default application for accessing the resource; or other suitable information. In some implementations, a portion of resource database 206 may be accessed through a remote network, and may be a third-party database.

User database 208 may be a computer-readable and -writable medium storing information associated with at least one user of document collaboration engine 200. The information may include one or more of a username and password associated with a user, cloud computing account information associated with the user, pointers to files associated with the user, pointers to document models associated with the user, information regarding whether a user may access or manipulate a file associated with the user, a list of at least one client 114, 124, or 144 associated with the user, user-specified preferences, or other suitable user information. In some implementations, user database 208 may record whether a user has subscribed to a binary data file. In such implementations, if a user is recorded as having subscribed to a binary data file, communication processor 204 may transmit the user a message regarding any changes to the binary data file. In some implementations, user database 208 may be integrated with resource database 206: a user's files and links to files may be stored with other user information.

Model memory 210 may be a computer-readable and -writable medium storing at least one document model, a computer resource that represents a binary data file and may be modified by one or more of a third-party application 116, a native application 126, or a binary data application 146. In some implementations, a document model may be a JavaScript Object Notation (JSON) stream, such that any change made by an application to the document model is forwarded to all other applications accessing the document model. In response to a first request by an application to access a binary data file, document processor 212 generates an empty document model associated with both the binary data file and the requesting application. The application requesting access may then be allowed to populate the document model based on the binary data file. Other instances of the application that subsequently request access to the binary data file may be provided with the populated document model if the document model still accurately reflects the binary data file. A document model may be revised in response to user commands received via an application, and model memory 210 may store information regarding when and by whom a document model was revised. In some implementations, a document model associated with one application may be updated in response to a different application revising the corresponding binary data file. Such a document model update may be implemented by recreating the document model, by generating a new document model based on the revised binary data file and merging the new document model with the previous document model, or through some other suitable process.

Document processor 212 may be a computer processor that enables collaboration on a binary data file by carrying out user instructions and transmitting information to the user via communication processor 204, network 102, and one or more of clients 114, 124, and 144 and third-party server system 134. As described in relation to FIG. 3, when a user requests access to a document not in a collaborative document format, document processor 212 may allow the user to modify a model corresponding to the requested document and the application that generated the request and stored in model memory 210. Document processor 212 may revise the corresponding binary file based on changes to the document model. Document processor 212 may also forward changes made to a document model by one user to other users accessing the document model at the same time. In some implementations, document processor 212 may likewise coordinate changes made between different document models associated with a single binary data file.

Document collaboration engine 200 sends data to and receives data from clients 114, 124, and 144 and third-party server system 134 at communication port 202 via network 102. Communication processor 204 may identify a cloud computing account associated with a user upon the establishment of a connection. Communication processor 204 may also compare information provided by or through a client or a third-party server with information stored in resource database 206 or user database 208 to verify that the user's request to access a binary data file is authorized. Communication processor 204 also forwards requests to access or alter a binary data file from a user to document processor 212. Document processor 212 may provide the user with access to a document model stored in model memory 210 based on the requested binary data file and which application the user is using. Document processor 212 may modify the document model based on authorized user inputs, update the associated binary data file based on the changes to the document model, and may forward revisions to other users accessing document models associated with the binary data file.

In some implementations, one or more elements of document collaboration engine 200 may also or alternatively be implemented on a client or on a third-party server system. In some such implementations, elements may be implemented differently on a client 114, 124, or 144 than they are on document collaboration engine 200. As an illustrative example of such implementations, a client 114, 124, or 144 may allow a user to identify which portions of a document an input relates to or request that users associated with a portion of the document affected by the input be notified of the input.

Figure 3:
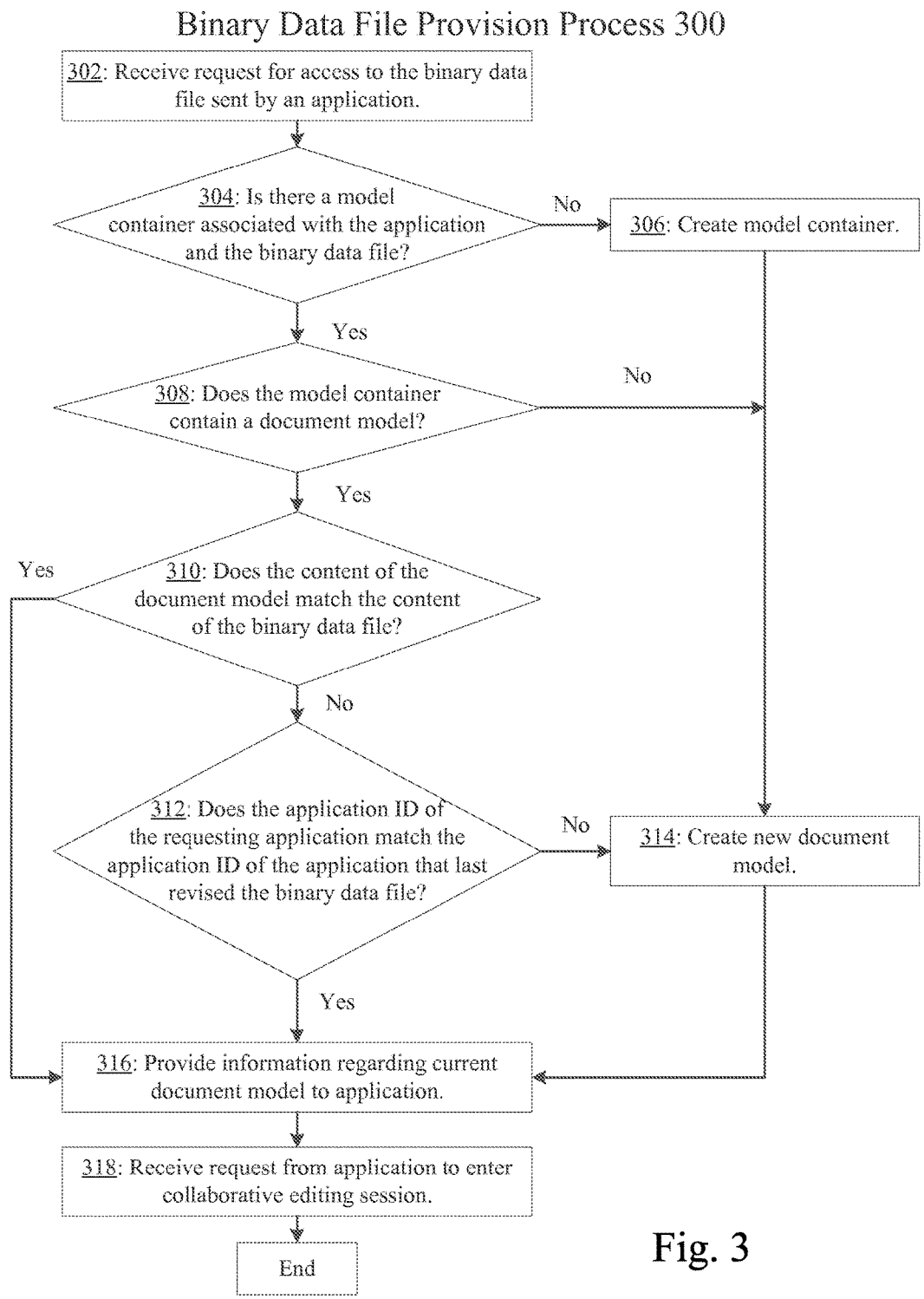
FIG. 3 is a flow chart of a process for providing a binary data file to client applications, according to an illustrative implementation.

FIG. 3 is an illustrative flowchart of a binary data file provision process 300. Process 300 allows users to collaborate on binary data files that need not be in a collaborative document format. Referring to FIG. 2, process 300 begins with step 302, in which communication processor 204 receives a request for a binary data file and forwards the request to document processor 212. The request may include information identifying the requested binary data file, the user making the request, an application ID identifying the application through which the user is making the request, or other suitable information identifying what data is to be accessed and how the data is to be accessed. The application ID may only differentiate editor applications and not instances of a particular editor application. As an illustrative example, user A may use client CA and editor application EA to access a binary data file from the collaborative server application, while user B uses client CB and editor application EA to access the collaboration server application. In such an example, the application ID may be the same for user A's application and user B's application even though each is using a different copy of application EA. In some implementations, the application and document collaboration engine 200 may use commands defined by an application programmable interface to communicate with each other.

In some implementations, communication processor 204 may compare information received in step 302 to information stored in one or more of resource database 206, user database 208, and model memory 210 to verify that the user is authorized to access the requested file with the requested application. In such implementations, if the communication processor 204 does not verify that the request is authorized, it may deny the user's request and take remedial action, which may include generating an error code, blocking the user or application from making further requests, generating a message to the user or a system administrator, or other suitable action.

In step 304, document processor 212 determines whether model memory 210 stores a model container corresponding to the requested binary data file and the requesting application. The model container may be a data structure, a directory, or some other suitable storage structure for storing collaborative document models associated with the requested binary data file and the requesting application. If there is no such container, document processor 212 generates an empty model container in step 306, and process 300 continues to step 314, described below. Otherwise, process 300 continues to step 308, in which document processor 212 determines whether the model container includes a document model. If the model container is empty, process 300 proceeds to step 314, described below. Otherwise, process 300 proceeds to step 310.

If the model container includes a document model, then, in step 310, document processor 212 determines whether the content of the document model matches that of the binary data file. In some implementations, more than one document model may be stored in the model container, in which case a document model may be selected for comparison based on when it was last modified, by whom it was last modified, or some other suitable criteria. In some implementations, step 310 entails applying a hash algorithm (such as the MD5 algorithm or some other suitable algorithm) to both the collaborative document model and the binary data file and determining whether the resulting hashes are equal. In some such implementations, the document processor 212 requests the hash for the document model, the binary data file, or both from the requesting application. If document processor 212 finds that the content of the document model matches the content of the binary data file, process 300 proceeds to step 316, described below; otherwise, it continues to step 312.

In step 312, document processor 212 compares the application ID of the application requesting access to the binary data file with the application ID of the last application to revise the binary data file. If the two do not match, then process 300 may proceed to step 314, in which document processor 212 adds a new document model to the model container to reflect the updated binary data file. In some implementations, the new collaborative document model may be an empty document model. An empty document model may be a document model with no data content. In such implementations, document processor 212 may provide the empty document model and the most recent version of the binary data file to the requesting application via communication processor 204 and allow the application to update the model to reflect the most recent version of the binary data file. The application may provide such an update through an API. The application may be run by a client, a third-party server, the document collaboration engine 200, or some other suitable computing device.

In some implementations, the new document model generated in step 314 may replace any older document models in the container. In other implementations, the container may include more than one document model, and older document models may be available for users to access. As an illustrative example of such an implementation, a document model that was being accessed when its associated binary data file was modified by an unrelated program may be preserved to allow a user to merge the changes to the document model with the changes to the binary data file. After a new document model is created in step 314, process 300 proceeds to step 316.

As indicated above, depending on the determinations made by document processor 212 in steps 310 and 312, process 300 will reach step 316 after either step 310, 312, or 314. In step 316, document processor 212 provides (via communication processor 204) information regarding the most current document model to the application that generated the request of step 302. Process 300 then concludes with step 318, in which communication processor 204 receives a request from the application to enter a collaborative editing session using the document model indicated in step 316. In such a session, communication processor 202 provides the document model to the application, which in turn may allow the user to alter the document model. Based on the user's changes to the document model, the application may transmit corresponding changes to the binary data file to document collaboration engine 200, or may transmit changes to the document model to document collaboration engine 200 for forwarding to other users in the same collaborative session.

Figure 4:
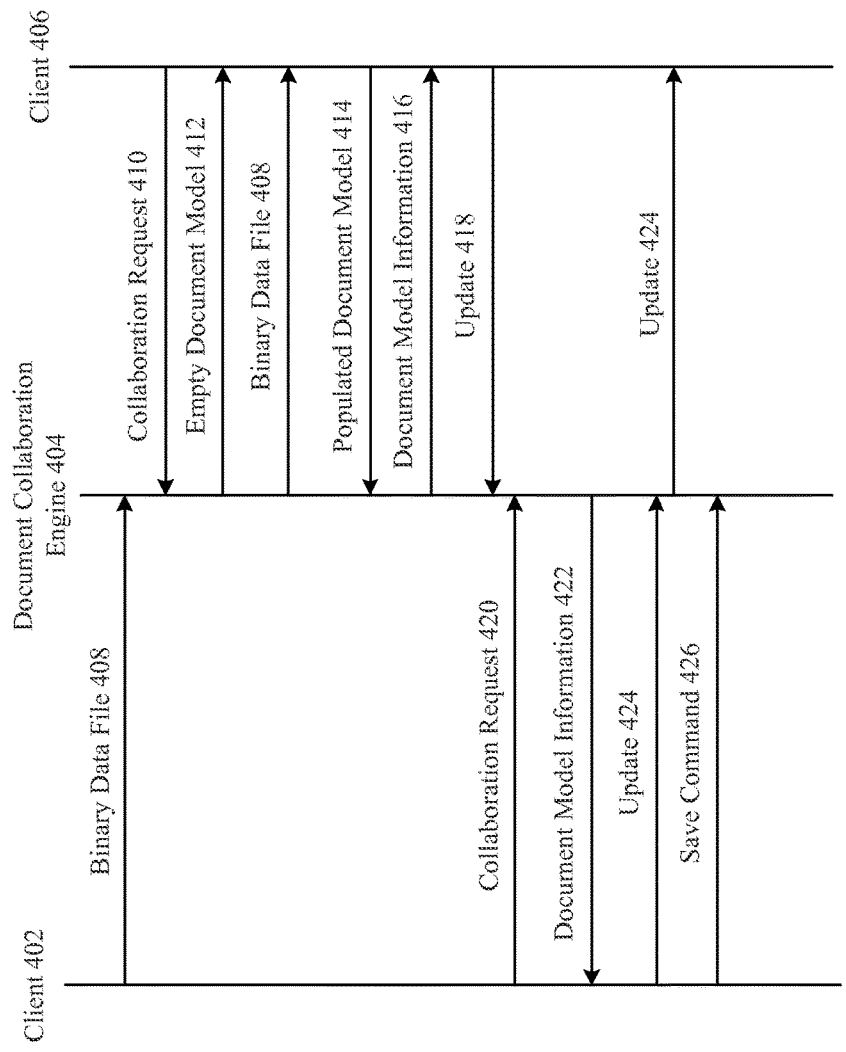
FIG. 4 is an exemplary process diagram depicting collaboration between two clients running the same client application, according to an illustrative implementation.

FIG. 4 is an exemplary process diagram depicting a same-application collaboration process 400, in which two separate clients use the same application to collaborate on a binary data file. As depicted, a document collaboration engine 404, such as document collaboration engine 200 of FIG. 2, is in communication with a client 402 and a client 406, each of which may be like clients 114 or 124 of FIG. 1. Client 402 transmits a binary data file 408 to document collaboration engine 404. Client 406 then transmits a collaboration request 410 to document collaboration engine 404, requesting access to binary data file 408. In accordance with binary data file collaboration process 300, document collaboration engine 404 transmits an empty document model 412 and binary data file 408 to client 406. Client 406 populates the empty document model 412 based on binary data file 408 and returns populated model 414 to document collaboration engine 404. Document collaboration engine 404 can then mediate collaboration between users. Document collaboration engine 404 consequently transmits document model information 416 to client 406, allowing client 406 to begin collaborating on the document model representing the binary data file. Document model information 416 may include a link to the model, a token required for modifying the model, or other information for joining a session of collaboration on the document model.

As depicted, client 406 revises the document model by transmitting an update 418 to document collaboration engine 404. When client 402 subsequently makes a collaboration request 420 directed to binary data file 408, document collaboration engine 404 replies with document model information 422, representing the information provided in document model information 416 but updated according to the revision made by client 406. Client 402 may then collaborate with client 406. Client 402 revises the document model by sending update 424 to document collaboration engine 404. Document collaboration engine 404 then transmits update 424 to client 406, providing client 406 with an up-to-date version of the document model. In some implementations, clients 402 and 406 may transmit updates as they are made and document collaboration engine 404 may forward updates as they are received, such that each user is presented with an effectively real-time view of changes made to the document model. Client 402 may send a save command 426 to document collaboration engine 404, prompting document collaboration engine 404 to revise binary data file 408 based on the current version of the document model. Save command 426 may include instructions on how to modify binary data file 408 to reflect the current document model, a binary data file that reflects the document model and may be used to replace binary data file 408, or other suitable information. In some implementations, a client disconnecting from document collaboration engine 404 may be treated as a save command, in which case document collaboration engine 404 may request instructions for updating the binary data file from a client still connected to collaboration document engine 404.

Figure 5:
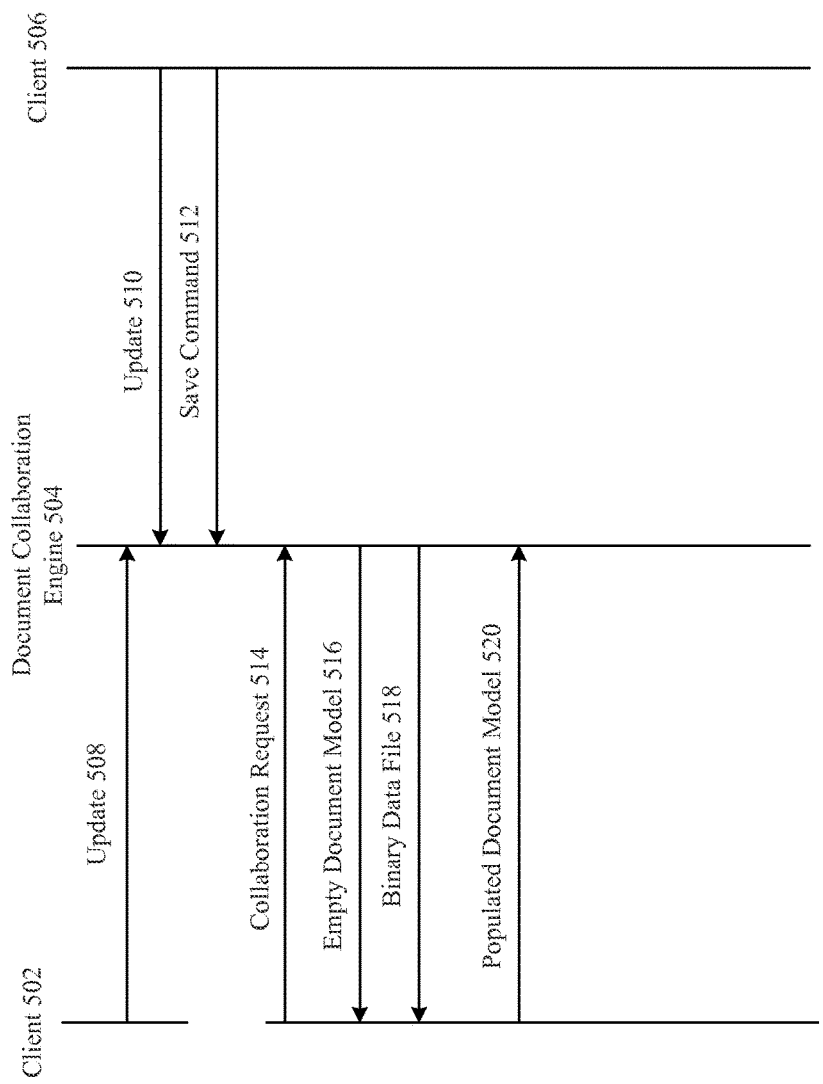
FIG. 5 is an exemplary process diagram depicting providing document models to two different client applications, according to an illustrative implementation.

FIG. 5 is an exemplary process diagram depicting a differing application collaboration process 500, in which two separate clients use different applications to modify a binary data file. As depicted, a document collaboration engine 504, such as document collaboration engine 200 of FIG. 2, is in communication with a client 502 and a client 506, each of which may be like clients 114 or 124 of FIG. 1. In process 500, client 502 has used a first application to request access to a binary data file, and client 506 has used a different application to access a binary data file. As each client is using a different application, each client is provided with a separate document model associated with the binary data file. As depicted, client 502 transmits an update 508 to document collaboration engine 504. As clients 502 and 506 do not share a document model, document collaboration engine 504 may not provide client 506 with update 508. As depicted, client 502 then disconnects from document collaboration engine 504. After client 506 transmits an update 510 and a save command 512 to collaboration engine 504, client 502 transmits a collaboration request 514 to document collaboration engine 504, requesting access to the same binary data file as before. As client 506 updated the binary data file using a different application than that used by client 502, document collaboration engine 504 transmits an empty document model 516 and the revised binary data file 518 to client 502 in accord with binary data file collaboration process 300. Client 502 then returns a populated document model 520 to document collaboration system 504, and may proceed to revise its document model as before.

In some implementations, client 502 may merge the changes between the previous version of its document model and the new version of the binary data file. Such changes may be merged based on when the changes were made, semantic rules, user input, or some other suitable criteria. As illustrative examples of such an implementation, client 502 may reintroduce a change that was made to the old document model after the application associated with client 502 last updated the binary data file, but before the most recent revision to the binary data file; client 502 may also or alternatively detect conflicts between changes to the binary data file and the old document model based on semantic or other rules, and ask the user how to resolve the conflict.

In some implementations, document collaboration system 504 may provide updates made to a binary data file by one application to another application accessing a document model associated with the binary data file while the other application is accessing the document model. In such implementations, when a binary data file is updated by an application, document collaboration engine 504 determines which other applications are currently accessing document models associated with the same binary data file. Document collaboration engine 504 may use an API to transmit changed portions of the binary data file to an application, allowing the receiving application to translate changes in the binary data file to changes in its document model. Then the receiving application may change its associated document model as though document collaboration engine 504 had transmitted a standard update to the document model. In some other such implementations, document collaboration engine 504 may instead generate a new document model and transmit the new document model and the revised binary data file to the application that did not change the binary data file. The application may then populate the new document model based on the received binary data file, and, as explained above, merge the changes between the document model it had been accessing and the new document model it just created.

Figure 6:
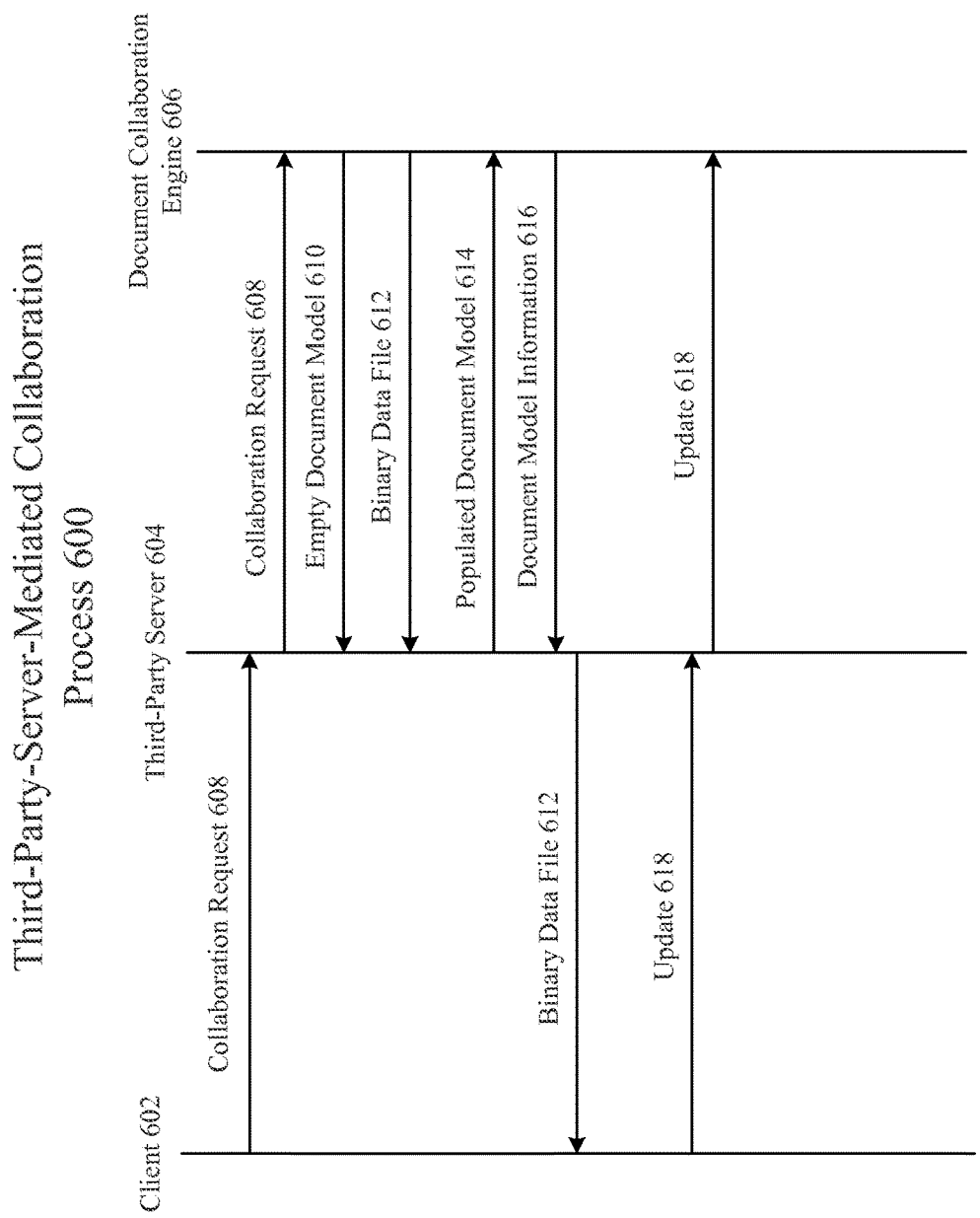
FIG. 6 is an exemplary process diagram depicting providing access to a binary data file through a third-party server, according to an illustrative implementation.

FIG. 6 is an exemplary process diagram depicting a third-party-server-mediated collaboration process 600, in which a client 602 acts through third-party server 604 to modify a binary data file associated with document collaboration engine 606. Referring to FIG. 1, client 602 may correspond to client 144 and third-party server 604 to third-party server system 134. Referring to FIG. 2, document collaboration engine 606 may correspond to document collaboration engine 200. As depicted, client 602 makes a binary data file access request 608 of third-party server 604, which forwards the request to document collaboration engine 606. In some implementations, client 602 may request access directly from document collaboration engine 606. As described in relation to FIG. 3, document collaboration engine 606 determines that the request is associated with third-party server 604, and, as depicted, transmits an empty document model 610 and the binary data file 612 to third-party server 604. Third-party server 604 translates the binary data file into a document model that it stores in empty document model 610 to generate filled document model 614. Third-party server 604 transmits filled document model 614 to document collaboration engine 606, which then provides document model information 616 to third-party server 604. Document model information 616 is similar to document model information 416 of FIG. 4. Third-party server 604 provides the binary data file 612 to client 602, and, on receiving a revision 618 from client 602, will translate the change to the binary data file 612 into a change to document model 614, and transmit the document model change to document collaboration engine 606 as update 620. In some implementations, if document collaboration engine 606 receives other changes to the document model while client 602 is accessing the associated binary data file via third-party server 604, document collaboration engine 606 may forward those changes to third-party server 604. Third-party server 604 may in turn forward those changes to client 602, such as by generating and transmitting a revised binary data file based on the revised document model, by instructing client 602 to change the binary data file to match the received revisions to the document model, or through some other suitable means.

In some implementations, the combination of client 602 and third-party server 604 may act as a single client in the context of processes 300, 400, or 500.

Figure 7:
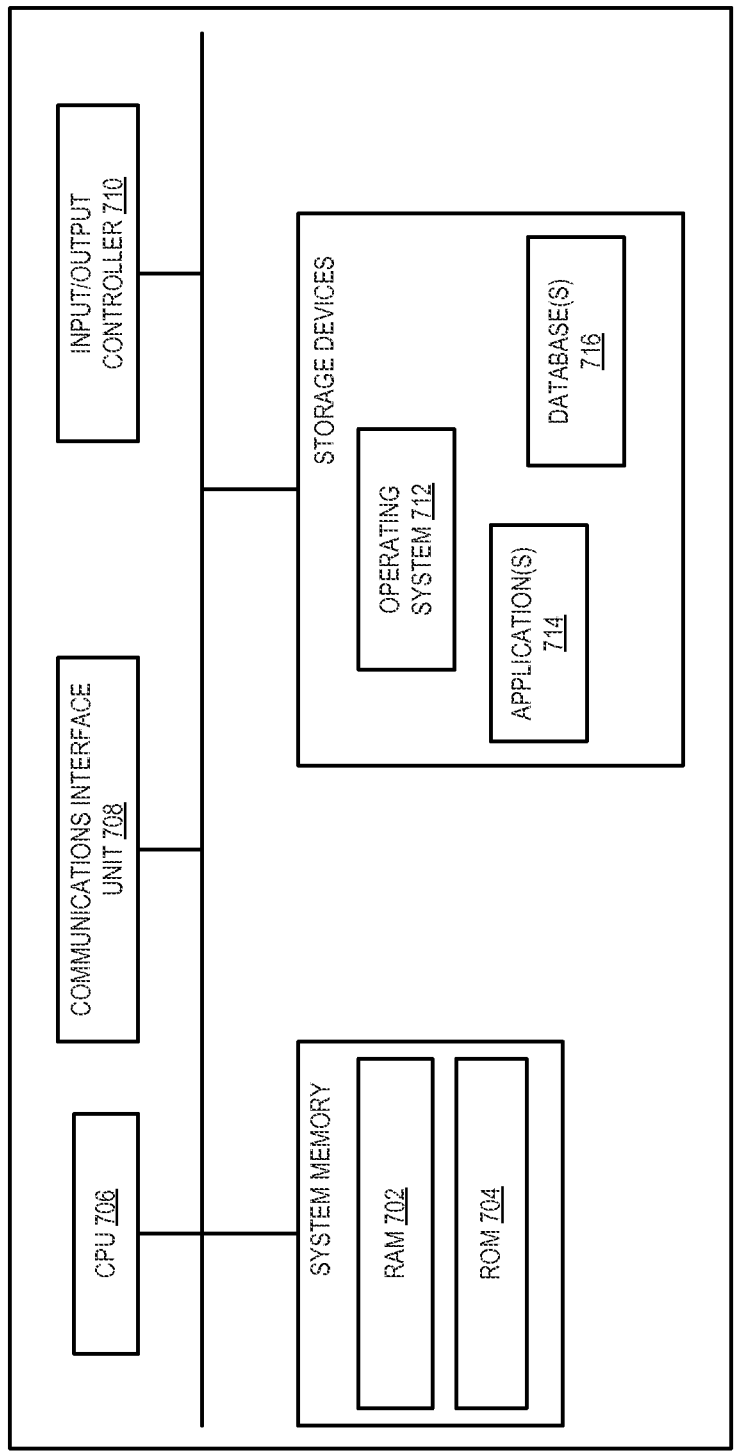
FIG. 7 is a block diagram of a computing device for performing any of the processes described herein, according to an illustrative implementation.

FIG. 7 is a block diagram of a computing device that can be used to implement or support any of the components of the system of FIG. 1 or 2, and for performing any of the processes described herein. Document collaboration engine 200 may be implemented on one or more computing devices 700 having suitable circuitry, and clients 114, 124, and 144 and third-party server system 134 may communicate with server system 104 through one or more computing devices 700 having suitable circuitry. In certain aspects, a plurality of the components of document collaboration system 100 may be included within one computing device 700. In certain implementations, a component and a storage device may be implemented across several computing devices 700.

The computing device 700 comprises at least one communications interface unit 708, an input/output controller 710, system memory, and one or more data storage devices. This can support a network connection such as a connection to network 102 in FIG. 1. The system memory includes at least one random access memory (RAM 702) and at least one read-only memory (ROM 704). RAM 702 can support the resource database 206 of FIG. 2, for example. All of these elements are in communication with a central processing unit (CPU 706) to facilitate the operation of the computing device 700. The computing device 700 may be configured in many different ways. For example, the computing device 700 may be a conventional standalone computer or alternatively, the functions of computing device 700 may be distributed across multiple computer systems and architectures. In FIG. 7, the computing device 700 may be linked, via network or local network, to other servers or systems.

The computing device 700 may be configured in a distributed architecture, wherein databases and processors are housed in separate units or locations. Some units perform primary processing functions and contain, at a minimum, a general controller or a processor and a system memory. In distributed architecture implementations, each of these units may be attached via the communications interface unit 708 to a communications hub or port (not shown) that serves as a primary communication link with other servers, client or user computers, and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM, and TCP/IP.

The CPU 706 comprises a processor, such as one or more conventional microprocessors and one or more supplementary co-processors such as math co-processors for offloading workload from the CPU 706. The CPU 706 is in communication with the communications interface unit 708 and the input/output controller 710, through which the CPU 706 communicates with other devices such as other servers, user terminals, or devices. The communications interface unit 708 and the input/output controller 710 may include multiple communication channels for simultaneous communication with, for example, other processors, servers, or client terminals.

The CPU 706 is also in communication with the data storage device. The data storage device may comprise an appropriate combination of magnetic, optical, or semiconductor memory, and may include, for example, RAM 702, ROM 704, flash drive, an optical disc such as a compact disc, or a hard disk or drive. The CPU 706 and the data storage device each may be, for example, located entirely within a single computer or other computing device; or connected to each other by a communication medium, such as a USB port, serial port cable, a coaxial cable, an Ethernet cable, a telephone line, a radio frequency transceiver, or other similar wireless or wired medium or combination of the foregoing. For example, the CPU 706 may be connected to the data storage device via the communications interface unit 708. The CPU 706 may be configured to perform one or more particular processing functions.

The data storage device may store, for example, (i) an operating system 712 for the computing device 700; (ii) one or more applications 714 (e.g., computer program code or a computer program product) adapted to direct the CPU 706 in accordance with the systems and methods described here, and particularly in accordance with the processes described in detail with regard to the CPU 706; or (iii) database(s) 716 adapted to store information that may be utilized to store information required by the program. The depicted database 716 can be any suitable database system, and can be a local or distributed database system.

The operating system 712 and applications 714 may be stored, for example, in a compressed, an uncompiled and an encrypted format, and may include computer program code. The instructions of the program may be read into a main memory of the processor from a computer-readable medium other than the data storage device, such as from the ROM 704 or from the RAM 702, or from a computer data signal embodied in a carrier wave, such as that found within the well-known Web pages transferred among devices connected to the Internet. While execution of sequences of instructions in the program causes the CPU 706 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to document collaboration as described herein. The program also may include program elements such as an operating system 712, a database management system, and "device drivers" that allow the processor to interface with computer peripheral devices (e.g., a video display, a keyboard, a computer mouse, etc.) via the input/output controller 710.

The term "computer-readable medium" as used herein refers to any non-transitory medium that provides or participates in providing instructions to the processor of the computing device 700 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 706 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 700 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic, or optical signals, which are exemplary forms of wireless communications or data streams that carry various types of information.

Some implementations of the above described may be implemented by the preparation of application-specific integrated circuits or by interconnecting an appropriate network of conventional component circuits, as will be apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

While various implementations of the present disclosure have been shown and described herein, it will be obvious to those skilled in the art that such implementations are provided by way of example only. Numerous variations, changes, and substitutions will now occur to those skilled in the art without departing from the disclosure. For example, if two different applications translate binary data files in the same format into document models in the same way, they may share a single application ID to better enable real-time collaboration between their respective users. It should be understood that various alternatives to the implementations of the disclosure described herein may be employed in practicing the disclosure. Elements of an implementation of the systems and methods described herein may be independently implemented or combined with other implementations. It is intended that the following claims define the scope of the disclosure and that methods and structures within the scope of these claims and their equivalents be covered thereby.

We claim:

1. A computer-implemented method for providing a binary data file to at least a first client application and a second client application, the method comprising:
   receiving by a receiving circuitry, a first request to access the binary data file from the first client application;
   identifying by a determining circuitry, a first document model associated with the binary data file, wherein the first document model is generated by the first client application upon determining a first logical structure of the binary data file such that any edits made to the binary data file by the first client application and the second client application are reflected in the first document model;
   transmitting by a transmitting circuitry, data corresponding to the first document model to the first client application;
   receiving, from the second client application, a second request indicating a modification to the binary data file;
   revising the first document model associated with the binary data file to include the modification to the binary data file; and
   transmitting data corresponding to the revised first document model to the second client application.

2. The method of claim 1, further comprising:
   receiving a first modification to the first document model from the first client application; and
   revising the binary data file based on the first modification.

3. The method of claim 2, further comprising:
receiving, from the second client application, a second modification to a second document model corresponding to the binary data file and associated with the second client application;
determining whether the binary data file was revised by an application other than the second client application after data corresponding to the second document model was transmitted to the second client application;
in response to determining that the binary data file was revised by an application other than the second client application after data corresponding to the second document model was transmitted to the second client application, transmitting a message regarding the revised binary data file to the second client application; and
receiving a response from the second client application.

4. The method of claim 3, wherein the response from the second client application is a command to overwrite the revised binary data file with a binary data file corresponding to the revised second document model.

5. The method of claim 3, wherein the response from the second client application is a command to generate a new binary data file corresponding to the revised second document model and to associate the second document model with the new binary data file.

6. The method of claim 3, wherein the response from the second client application is a command to combine the second document model with the revised binary data file.

7. The method of claim 2, further comprising:
receiving a subscription request associated with the binary data file and identifying a third client application; and
in response to the revision of the binary data file, transmitting a notification regarding the revision to the third client application based on the subscription request.

8. The method of claim 2, further comprising modifying, based on the revised binary data file, a second document model corresponding to the binary data file and associated with the second client application.

9. The method of claim 1, further comprising,
receiving a second request to access the binary data file from the second client application;
determining that a second document model corresponding to the binary data file exists, wherein the second document model is generated by the second application upon determining a second logical structure of the binary data file such that any edits made to the binary data file by the first client application and the second client application are reflected in the second document model; and
in response to determining that the second document model exists, transmitting data corresponding to the second document model to the second client application.

10. The method of claim 9, wherein the second document model is the first document model.

11. The method of claim 10, further comprising:
receiving a modification to the first document model from the first client application;
revising the first document model based on the modification to the first document model; and
transmitting the revised first document model to the second client application.

12. The method of claim 9, further comprising generating, in response to determining that the second document model does not exist, the second document model corresponding to the binary data file and associated with the second client application.

13. The method of claim 9, further comprising:
determining whether the second document model matches the content of the binary data file;
determining whether the binary data file was last modified by the second client application;
in response to determining that the second document model matches the content of the binary data file or that the binary data file was last modified by the second client application, transmitting data corresponding to the second document model to the second client application; and
in response to determining that the second document model does not match the content of the binary data file and that the binary data file was not last modified by the second client application:
generating a new second document model; and
transmitting the new second document model to the second client application.

14. The method of claim 1, further comprising:
providing information regarding the binary data file to the first client application; and
instructing the first client application to populate an empty document model based on the information regarding the binary data file.

15. The method of claim 1, wherein the first document model is composed of a stream of JavaScript Object Notation objects.

16. A document collaboration system providing a binary data file of a plurality of binary data files to at least a first client application and a second client application, the system comprising:
a communication processor in communication with:
a document database for storing the plurality of binary data files;
a model memory for storing a plurality of document models comprising a first document model;
a document processor configured to:
identify the first document model, associated with the binary data file, wherein the first document model is generated by the first application upon determining a first logical structure of the binary data file such that any edits made to the binary data file by the first client application and the second client application are reflected in the first document model, and
revise the first document model associated with the binary data file to include a modification to the binary data file received from the first client application or the second client application;
wherein the communication processor is configured to:
receive a first request to access the binary data file from the first client application,
transmit data corresponding to the first document model to the first client application,
receive, from the second client application, a second request indicating the modification to the binary data file, and
transmit data corresponding to the revised first document model to the second client application.

17. The system of claim 16, wherein the communication processor is further configured to receive a first modification to the first document model from the first client application, and the document processor is further configured to revise the binary data file based on the first modification.

18. The system of claim 17, wherein:
the document processor is further configured to determine whether the binary data file was revised by an application other than the second client application after data corresponding to a second document model was transmitted to the second client application, wherein the second document model corresponds to the binary data file and is associated with the second client application; and
the communication processor is further configured to:
transmit, to the second client application, a message regarding a revision to the binary data file, and
receive a response from the second client application.

19. The system of claim 18, wherein the response from the second client application is a command to overwrite the revised binary data file with a binary data file corresponding to the revised second document model.

20. The system of claim 18, wherein the response from the second client application is a command to generate a new binary data file corresponding to the revised second document model and to associate the second document model with the new binary data file.

21. The system of claim 18, wherein the response from the second client application is a command to combine the second document model with the revised binary data file.

22. The system of claim 17, wherein the communication processor is further configured to:
receive a subscription request associated with the binary data file and identify a third client application: and
in response to the revision of the binary data file, transmit a notification regarding the revision to the third client application based on the subscription request.

23. The system of claim 17, wherein the document processor is further configured to modify, based on the revised binary data file, a second document model corresponding to the binary data file and associated with the second client application.

24. The system of claim 16, wherein:
the document processor is further configured to determine that a second document model corresponding to the binary data file exists, wherein the second document model is generated by the second application upon determining a second logical structure of the binary file such that any edits made to the binary file by the first client application and the second client application are reflected in the second document model; and
the communication processor is further configured to:
receive a second request to access the binary data file from the second client application, and
in response to determining that the second document model associated with the second client application exists, transmit data corresponding to the second document model to the second client application.

25. The system of claim 24, wherein the second document model is the first document model.

26. The system of claim 25, wherein:
the document processor is further configured to revise the first document model and the binary data file based on a modification received from the first client application; and
the communication processor is further configured to receive a modification to the first document model from the first client application and transmit a revised first document model to the second client application.

27. The system of claim 24, wherein the document processor is further configured to generate, in response to determining that the second document model does not exist, the second document model corresponding to the binary data file and associated with the second client application.

28. The system of claim 24, wherein the document processor is further configured to:
determine whether content of the second document model matches content of the binary data file;
determine whether the binary data file was last modified by the second client application; and
in response to determining that the content of the second document model does not match the content of the binary data file and that the binary data file was not last modified by the second client application, generate a new second document model.

29. The system of claim 16, wherein the communication processor is further configured to:
provide information regarding the binary data file to the first client application; and
instruct the first client application to populate an empty document model based on the information regarding the binary data file.

30. The system of claim 16, wherein the first document model is composed of a stream of JavaScript Object Notation objects.

31. A non-transitory computer-readable storage medium comprising instructions that, when executed by a processing device, cause the processing device to perform operations for providing a binary data file to at least a first client application and a second client application, the operations comprising:
receiving a request to access the binary data file from the first client application;
identifying a document model, associated with the binary data file, wherein the document model is generated by the first client application upon determining a logical structure of the binary data file such that any edits made to the binary data file by the first client application and the second client application are reflected in the document model;
transmitting data corresponding to the document model to the first client application;
receiving, from the second client application, a second request indicating a modification to the binary data file;
revising the document model associated with the binary data file to include the modification to the binary data file; and
transmitting data corresponding to the revised document model to the second client application.

* * * * *